United States Patent
Campbell et al.

(10) Patent No.: US 7,446,860 B1
(45) Date of Patent: Nov. 4, 2008

(54) LASER FRESNEL DISTANCE MEASURING SYSTEM AND METHOD

(75) Inventors: Jonathan W. Campbell, Madison, AL (US); David L. Lehner, Huntsville, AL (US); Larry L. Smalley, Huntsville, AL (US); Kelly L. Smith, deceased, late of Madison AL (US); by Molly C. Smith, legal representative, Madison, AL (US); Alvin J. Sanders, Knoxville, TN (US); Dennis Duncan Earl, Knoxville, TN (US); Stephen W. Allison, Knoxville, TN (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 31 days.

(21) Appl. No.: 11/527,648

(22) Filed: Sep. 18, 2006

(51) Int. Cl.
    *G01C 3/08* (2006.01)
(52) U.S. Cl. .................................... 356/4.03
(58) Field of Classification Search ....... 356/3.01–3.15, 356/4.01–4.1, 5.01–5.15, 6–22, 28, 28.5
    See application file for complete search history.

(56) References Cited

U.S. PATENT DOCUMENTS

| 4,678,324 | A  | * | 7/1987 | De Witt | 356/4.09 |
| 6,323,949 | B1 | * | 11/2001 | Lading et al. | 356/477 |
| 2001/0048517 | A1 | * | 12/2001 | Shirai | 356/5.1 |
| 2006/0164630 | A1 | * | 7/2006 | Hofbauer | 356/141.1 |

* cited by examiner

*Primary Examiner*—Thomas H. Tarcza
*Assistant Examiner*—Luke D Ratcliffe
(74) *Attorney, Agent, or Firm*—James J. McGroary; Peter J. Van Bergen

(57) ABSTRACT

A method and system for determining range to a target are provided. A beam of electromagnetic energy is transmitted through an aperture in an opaque screen such that a portion of the beam passes through the aperture to generate a region of diffraction that varies as a function of distance from the aperture. An imaging system is focused on a target plane in the region of diffraction with the generated image being compared to known diffraction patterns. Each known diffraction pattern has a unique value associated therewith that is indicative of a distance from the aperture. A match between the generated image and at least one of the known diffraction patterns is indicative of a distance between the aperture and target plane.

29 Claims, 2 Drawing Sheets

LASER FRESNEL DISTANCE MEASURING SYSTEM AND METHOD

ORIGIN OF THE INVENTION

The invention described herein was made in performance of work under a NASA contract and by an employee of the United States Government and is subject to the provisions of Section 305 of the National Aeronautics and Space Act of 1958, as amended, Public Law 85-568 (72 Stat. 435; 42 U.S.C. §2457), and 35 U.S.C. §202, and may be manufactured and used by the Government of the United States of America for governmental purposes without the payment of any royalties thereon or therefore. In accordance with 35 U.S.C. §202, the Contractor elected not to retain title.

BACKGROUND OF THE INVENTION

1. Field of the Invention

This invention relates to high-precision distance measuring systems and techniques. More specifically, the invention is a high-precision, laser Fresnel distance measuring system and method.

2. Description of the Related Art

Non-intrusive and highly accurate determination of distance to a "target" with a precision on the order of a micron or less would be useful in a variety of industrial, commercial, and government-related applications. For example, large adaptive mirrors used in space or ground applications require knowledge of the location of mirror segments to a very high precision in order to make corrections to an optical wavefront.

Conventional high-precision rangefinders can use lasers and complex processing systems/algorithms. For instance, U.S. Pat. No. 6,456,383 discloses a method and apparatus for making absolute distance measurements using Fresnel diffraction. Briefly, after a laser beam is reflected by a target, the reflected beam is passed through an aperture. A detector spaced from the aperture detects the central intensity of the beam (passed through the aperture) as well as intensities displaced from the beam's center. The intensities are then used to calculate the distance to the target using complex mathematical relationships. However, this system is limited to determination of distances on the order of a few centimeters.

SUMMARY OF THE INVENTION

Accordingly, it is an object of the present invention to provide a method and system for determining distance to a target.

Another object of the present invention is to provide a method and system for determining distance to a target with a precision on the order of a micron or better.

Other objects and advantages of the present invention will become more obvious hereinafter in the specification and drawings.

In accordance with the present invention, a method and system for determining distance to a target are provided. A beam of electromagnetic energy is transmitted through an aperture in an opaque screen such that a portion of the beam passes through the aperture to generate a region of diffraction (e.g., a Fresnel region) that varies as a function of distance from the aperture. An imaging system is focused on a target plane in the region of diffraction to generate an image of the target plane. The generated image is compared to a plurality of known diffraction patterns with each known diffraction pattern having a unique value associated therewith that is indicative of a distance from the aperture. A match between the generated image and at least one of the known diffraction patterns is indicative of a distance between the aperture and target plane.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
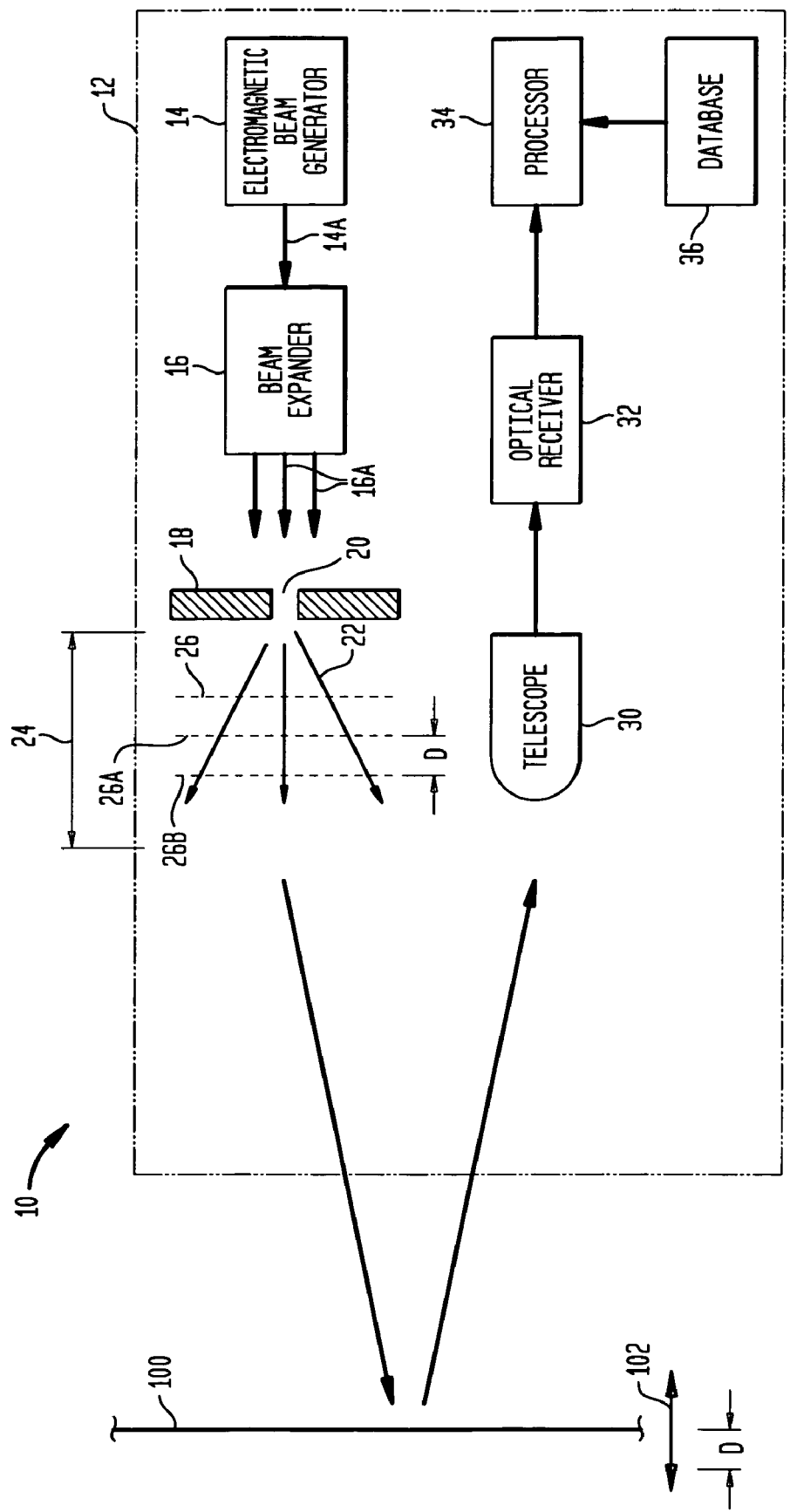
FIG. 1 is a schematic view of a laser Fresnel distance measuring system in accordance with an embodiment of the present invention.

Referring now to the drawings and more particularly to FIG. 1, a laser Fresnel distance measuring system in accordance with the present invention is shown and is referenced generally by numeral 10, the optical elements of which can be affixed to a platform 12. System 10 can be used in a wide variety of applications. Accordingly, it is to be understood that any references made herein with respect to specific applications are not limitations of the present invention.

System 10 includes an electromagnetic beam generator 14 (e.g., laser) mounted on platform 12 and capable of producing a beam 14A of electromagnetic energy. Depending on the approach used, beam generator 14 can be realized by (i) a single laser producing a single-wavelength laser beam, (ii) multiple lasers arranged to output their respective beams onto a shared optical path to produce beam 14A, or (iii) a tunable laser capable of outputting a variable-wavelength beam 14A.

In the illustrated embodiment, beam 14A is passed through a beam expander 16 (mounted on platform 12) to produce a parallel wavefront beam represented by parallel arrows 16A. Parallel wavefront beam 16A is incident on an opaque screen 18 mounted on platform 12. In general, a portion 22 of beam 16 passes through an aperture 20 formed through screen 18. After passing through aperture 20, portion 22 undergoes diffraction within a region that lies between lines 24. In terms of the present invention, diffraction region 24 is any region of diffracted radiation behind aperture 20 that is predictable and demonstrates a unique intensity pattern as a function of distance from aperture 20. Thus, the optical pattern of the diffraction region at a target plane (e.g., the target plane represented by dashed vertical line 26) located in diffraction region 24 varies with the distance between that target plane and aperture 20. By way of example, if the electromagnetic energy incident on screen 18 is parallel wavefront beam 16A, diffraction region 24 is a Fresnel diffraction region as is well known in the art.

Another of the optical elements fixedly mounted on platform 12 is a telescope 30 having a shallow or narrow depth-of-field focused on some plane in diffraction region 24. More specifically, the focal path length of telescope 30 includes the path to a reflective surface 100 and the path from reflective surface 100 to some target plane in diffraction region 24. Thus, telescope 30 and reflective surface 100 are part of an imaging system used to view a target plane in diffraction region 24. If telescope 30 has a shallow or narrow depth-of-field, the focal plane imaged by telescope 30 is similarly narrowly defined. As will become more apparent later in the description, the "shallowness" of the telescope's depth-of-field should be commensurate with the precision required of the distance that is to be measured.

Reflective surface 100 is representative of the surface of an object of interest that will experience movement referenced by two-headed arrow 102. The distance moved as a result of movement 102 is to be measured with a high degree of precision. The reflective nature of surface 100 can be inherent in the object experiencing movement 102 (e.g., a mirror). However, the reflective nature of surface 100 could also be provided by attaching a mirror to a non-reflective object of interest (not shown) to define reflective surface 100, or by reflectively coating the object of interest.

The image "viewed" by telescope 30 is provided to an optical receiver 32 (e.g., an image detector) that prepares the image for processing by a processor 34. Coupled to or integrated with processor 34 is a database 36 that stores known Fresnel diffraction patterns along with an associated unique distance at which each such pattern would be generated with the given arrangement of optical elements used to generate diffraction region 24. Receiver 32, processor 34 and/or database 36 can be located/mounted on or off platform 12 without departing from the scope of the present invention.

Each diffraction pattern defining region 24 is a function of the size of aperture 20, the wavelength of beam 14A, and the distance from aperture 20. Thus, for a given arrangement of beam generator 14, its operating wavelength, and aperture 20, a set of diffraction patterns from diffraction region 24 can be generated, mapped, and then stored (in database 36) as a function of distance from aperture 20.

In terms of measuring an absolute distance that reflective surface 100 moves, system 10 must be calibrated. During calibration, the optical elements of system 10 must remain in a fixed relationship with reflective surface 100. Since the optical elements of system 10 are typically fixed to platform 12, reflective surface 100 and platform 12 could be rigidly coupled to one another to achieve the fixed relationship. Once fixed in this fashion, the distance between telescope 30 and reflective surface 100 is measured using any conventional distance measuring tool. This distance becomes the base distance to which a distance change is added/subtracted to determine the absolute distance to reflective surface 100. Note that if only changes in distance are of interest, the calibration step can be omitted.

To calibrate system 10 while reflective surface 100 and platform 12 are rigidly coupled to one another, diffraction region 24 is generated and telescope 30 is focused on diffraction region 24. Specifically, a baseline target plane 26A in diffraction region 24 is imaged by telescope 30 with the location of baseline target plane 26A being governed by the relative position of reflective surface 100 and "width" or "thickness" of baseline target plane 26A being governed by the depth-of-field of telescope 30. The diffraction pattern viewed by telescope 30 is indicative of a baseline distance from aperture 20 to baseline target plane 26A. This baseline distance is determined by processor 34 via a comparison with the above-described mapped set of diffraction patterns stored in database 36 for the particular arrangement of generator 14/aperture 20 and the operating wavelength of generator 14.

When it is time for system 10 to measure the distance that reflective surface 100 moves via movement 102, the fixed relationship between the optical elements of system 10 and reflective surface 100 is abolished so that reflective surface 100 is free to undergo movement 102 while the optical elements of system 10 remain fixed. System 10 is then operated so that diffraction region 24 is generated and telescope 30 is focused on diffraction region 24 via reflection off reflective surface 100. The diffraction pattern (within diffraction region 24) at the focal plane of telescope 30 is indicative of the amount of movement of reflective surface 100. For example, if reflective surface 100 moves a distance D away from telescope 30 as shown, the target plane focused on by telescope 30 (i.e., target plane 26B) will also be a distance D from baseline target plane 26A. In the present invention, distance D can be determined (by processor 34) by (i) matching the diffraction pattern at target plane 26B with one of the stored patterns in database 36 in order to determine its associated distance from aperture 20, and (ii) determining the difference between the distance from aperture 20 associated with baseline target plane 26A and the distance from aperture 20 associated with target plane 26B.

Figure 2:
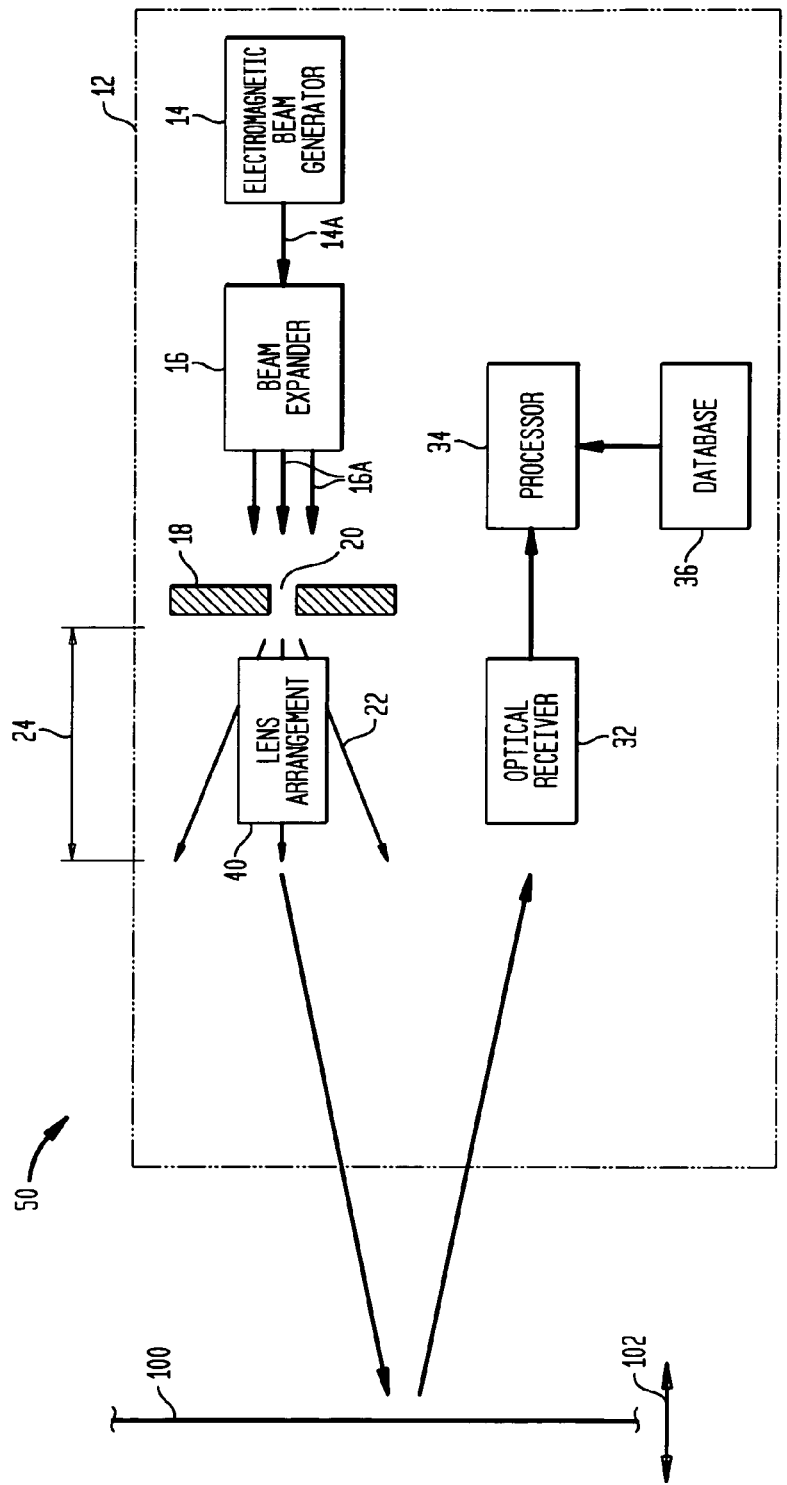
FIG. 2 is a schematic view of a laser Fresnel distance measuring system in accordance with another embodiment of the present invention.

The present invention is not limited to the particular system described above. For example, another distance measuring system 50 in accordance with the present invention is illustrated in FIG. 2 where the approach and optical elements used to generate diffraction region 24 are the same as described above with respect to system 10. However, rather than using a telescope to directly image a target plane in diffraction region 24, a lens arrangement 40 mounted to platform 12 and positioned in diffraction region 24 optically displaces the target plane to optical receiver 32. For example, lens arrangement 40 can be designed to have a fore and aft focal plane with the fore focal plane being calibrated through an initial calibration procedure (i.e., similar to that described above) to determine its distance to aperture 20 when the optical elements of system 50 are fixed in relation to reflective surface 100.

In both calibration and operation, the focused diffraction pattern passing through lens arrangement 40 is converted to a parallel wavefront that reflects off reflective surface 100 and onto optical receiver 32 where the parallel wavefront is converted back to an image of the diffraction pattern. That is, the diffraction pattern is optically moved to optical receiver 32. Thus, as the distance between optical receiver 32 and reflective surface 100 changes, the effective imaging location of receiver 32 in diffraction region 24 also changes. Thus, a different diffraction pattern indicative of such change is imaged by optical receiver 32. The functions of processor 34 and database 36 are the same as those described with respect to system 10.

While the present invention can utilize the entire image of a generated Fresnel diffraction pattern, processing speeds and efficiency associated with such "whole image" processing may limit the overall value of the system especially in high frequency applications. Accordingly, the present invention can also be practiced by using only one or more portions of the Fresnel diffraction pattern at a given target plane therein. Several non-limiting examples will be discussed herein.

In a first approach, processor 34 uses just the central portion (e.g., a center pixel) of the Fresnel diffraction pattern at a given target plane. In general and as is known in the art, the intensity of a Fresnel diffraction pattern varies as a function of source distance in accordance with a wavelike or sinusoidal function. Further, this intensity and its variability is greatest at the central portion of a Fresnel diffraction pattern so that even a very small change in source distance results in a detectable change in intensity.

If the range of distances of interest is sized to coincide with a single cycle of the wavelike or sinusoidal function governing the Fresnel diffraction pattern, then the central portion of the pattern will uniquely define the distance. However, as the range of distances of interest increases, the Fresnel diffraction pattern will undergo multiple cycles so that comparisons using just the intensity of the pattern's central portion produces ambiguous distance measurements. For example, if the range of distances of interest was such that the Fresnel diffraction pattern experienced five cycles over the range, a given intensity of the central portion of the pattern might be repeated five times with each such repeat being indicative of a different distance value. To remedy this ambiguity problem, a second approach of the present invention (e.g., programmed into processor 34) utilizes a second distinct portion (i.e., another pixel) of the pattern in combination with the central portion of the pattern. That is, processor 34 would compare the central and second portion of the imaged pattern with the corresponding central and second portion of the known patterns stored in database 36. The distance ambiguity problem is solved by requiring a match between both compared portions.

The ambiguity problem could also be addressed by means of a third approach of the present invention. More specifically, generator 14 could be a variable-wavelength laser capable of generating beam 14A of different wavelengths. Since the Fresnel diffraction pattern cycle will be unique for each wavelength of beam 14A and a given aperture 20, processor 34 could be programmed to collect pattern images at each of two (or more) different wavelengths. The central (or other) portion from each collected pattern/wavelength can then be used during the comparison with known Fresnel diffraction patterns/wavelengths to unambiguously determine distance.

Figure 3:
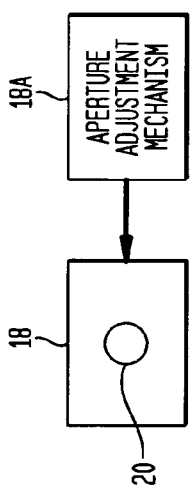
FIG. 3 is an isolated schematic view of the system's opaque screen equipped for aperture size adjustment.

Still further, a fourth approach of the present invention could utilize a single-wavelength laser for generator 14 but vary the size of aperture 20. For example, as shown in FIG. 3, screen 18 can have an aperture adjustment mechanism 18A incorporated with or coupled thereto to make aperture 20 smaller or larger. Since changing the size of aperture 20 changes the Fresnel diffraction pattern cycle, processor 34 could collect and utilize imaged patterns (or portions thereof) for two aperture sizes to unambiguously determine distance.

The advantages of the present invention are numerous. Distance measurements are accurately made without any complex hardware or software. It is only necessary to provide an optical arrangement (e.g., telescope 30) that has a depth-of-field precision on the order of the precision of the distance changes to be measured. The simple comparison approaches described herein can be implemented with minimal processor complexity without sacrificing measurement accuracy.

Although the invention has been described relative to a specific embodiment thereof, there are numerous variations and modifications that will be readily apparent to those skilled in the art in light of the above teachings. For example, the present invention is not limited to use with Fresnel diffraction as it will work with any radiation field region behind an aperture that is predictable and demonstrates a unique intensity pattern as a function of distance from the aperture.

Still further, should there be a concern about losing the absolute distance information momentarily during operation, the present invention can include a series of platform "stops" at known fixed distances from the screen's aperture. Each "stop" would provide the system with a new baseline distance in the event the system had to be re-started. This will reduce the amount of time lost each time the system must be re-started. It is therefore to be understood that, within the scope of the appended claims, the invention may be practiced other than as specifically described.

What is claimed as new and desired to be secured by Letters Patent of the United States is:

1. A method of determining range to a target, comprising the steps of:
    transmitting a beam of electromagnetic energy through an aperture in an opaque screen such that a portion of said beam passes through said aperture to generate a region of diffraction that varies as a function of distance from said aperture;
    focusing an imaging system on a target plane in said region of diffraction wherein an image of said target plane is generated; and
    comparing said image with a plurality of known diffraction patterns with each of said known diffraction patterns having a unique value associated therewith that is indicative of a distance from said aperture, wherein a match between said image and at least one of said known diffraction patterns is indicative of a distance between said aperture and said target plane.

2. A method according to claim 1 wherein the imaging system includes a movable reflective surface positioned in the imaging system's focal path wherein changes in distance between said aperture and said target plane are indicative of an amount of movement of the movable reflective surface.

3. A method according to claim 1 wherein said step of imaging includes the step of focusing a telescope on said target plane.

4. A method according to claim 1 wherein said step of imaging includes the step of optically displacing a portion of said region of diffraction located at said target plane to the imaging system generating said image.

5. A method according to claim 1 wherein said step of comparing utilizes a portion of said image.

6. A method according to claim 5 wherein said portion of said image coincides with a central portion of said region of diffraction.

7. A method according to claim 1 wherein said electromagnetic energy is defined by a single wavelength, and wherein said step of comparing utilizes two different portions of said image.

8. A method according to claim 1 further comprising the step of performing said steps of transmitting, focusing and comparing for at least two different sizes of said aperture.

9. A method according to claim 1 further comprising the step of performing said steps of transmitting, focusing and comparing for at least two different wavelengths of said electromagnetic energy.

10. A method of determining range to a target, comprising the steps of:
    transmitting a beam of electromagnetic energy through an aperture in an opaque screen such that a portion of said beam passes through said aperture to generate a Fresnel region of diffraction;
    focusing an imaging system on a target plane in said Fresnel region wherein an image of said target plane is generated; and
    comparing said image with a plurality of known Fresnel diffraction patterns with each of said known Fresnel diffraction patterns having a unique value associated therewith that is indicative of a distance from said aperture, wherein a match between said image and at least one of said known Fresnel diffraction patterns is indicative of a distance between said opaque screen and said target plane.

11. A method according to claim 10 wherein the imaging system includes a movable reflective surface positioned in the imaging system's focal path wherein changes in distance between said aperture and said target plane are indicative of an amount of movement of the movable reflective surface.

12. A method according to claim 10 wherein said step of imaging includes the step of focusing a telescope on said target plane.

13. A method according to claim 9 wherein said step of imaging includes the step of optically displacing said target plane in said Fresnel region to an imaging system generating said image.

14. A method according to claim 10 wherein said step of comparing utilizes a portion of said image.

15. A method according to claim 14 wherein said portion of said image coincides with a central portion of said Fresnel region.

16. A method according to claim 10 wherein said electromagnetic energy is defined by a single wavelength, and wherein said step of comparing utilizes two different portions of said image.

17. A method according to claim 10 further comprising the step of performing said steps of transmitting, focusing and comparing for at least two different sizes of said aperture.

18. A method according to claim 10 further comprising the step of performing said steps of transmitting, focusing and comparing for at least two different wavelengths of said electromagnetic energy.

19. A system for determining range to a target, comprising:
  means for generating a beam of electromagnetic energy;
  an opaque screen positioned in the path of said beam, said opaque screen having an aperture formed therethrough such that a portion of said beam passes through said aperture to generate a region of diffraction that varies as a function of distance from said aperture;
  imaging means for generating an image of a target plane in said region of diffraction; and
  processing means coupled to said imaging means for comparing said image with a plurality of known diffraction patterns with each of said known diffraction patterns having a unique value associated therewith that is indicative of a distance from said aperture, wherein a match between said image and at least one of said known diffraction patterns is indicative of a distance between said opaque screen and said target plane.

20. A system as in claim 19 wherein said imaging means includes a movable reflective surface positioned in the imaging system's focal path wherein changes in distance between said aperture and said target plane are indicative of an amount of movement of the movable reflective surface.

21. A system as in claim 19 further comprising a platform to which said means for generating, said opaque screen, and portions of said imaging means are fixedly coupled.

22. A system as in claim 19 wherein said imaging means includes a telescope focused on said target plane.

23. A system as in claim 19 wherein said imaging means comprises:
  an imager adapted to be positioned away from said region of diffraction; and
  an optical lens arrangement adapted to be positioned in said region of diffraction for optically displacing a portion of said region of diffraction located at said target plane to said imager.

24. A system as in claim 19 wherein said means for generating comprises at least one laser.

25. A system as in claim 19 wherein said means for generating comprises a single-wavelength laser.

26. A system as in claim 19 wherein said means for generating comprises a variable-wavelength laser.

27. A system as in claim 19 wherein said aperture is a circular aperture.

28. A system as in claim 27 wherein said means for generating includes means for forming said beam as a parallel wavefront beam prior to incidence on said opaque screen, wherein said region of diffraction comprises a Fresnel region of diffraction.

29. A system as in claim 27 further comprising means for adjusting the size of said circular aperture.

* * * * *